United States Patent [19]

Wolters

[11] Patent Number: 4,517,928
[45] Date of Patent: May 21, 1985

[54] SYSTEM FOR THE USE OF GAS AS SECONDARY FUEL IN DIESEL ENGINES

[75] Inventor: Leendert Wolters, Rhoon, Netherlands

[73] Assignee: Nederlandse Centrale Organisatie voor Toegepast Natuurwetenschappelijk Onderzoek, The Hague, Netherlands

[21] Appl. No.: 519,562

[22] Filed: Aug. 2, 1983

[30] Foreign Application Priority Data

Aug. 12, 1982 [NL] Netherlands .......................... 8203169

[51] Int. Cl.³ ........................ F02M 1/16; F02M 21/00
[52] U.S. Cl. .............................. 123/27 GE; 123/577; 123/458; 123/526
[58] Field of Search .................. 123/575, 577, 27 GE, 123/458, 525, 526

[56] References Cited

U.S. PATENT DOCUMENTS

| | | | |
|---|---|---|---|
| 2,400,247 | 5/1946 | Miller et al. ................... | 123/27 GE |
| 2,544,978 | 3/1951 | Blessings et al. .............. | 123/27 GE |
| 2,558,884 | 7/1951 | Steven et al. .................. | 123/27 GE |
| 2,908,258 | 10/1959 | Schowalter et al. .......... | 123/27 GE |
| 3,575,145 | 4/1971 | Steiger .............................. | 123/458 |
| 4,278,064 | 7/1981 | Regueiro ........................ | 123/27 GE |
| 4,463,734 | 8/1984 | Akeroyd ........................ | 123/27 GE |

FOREIGN PATENT DOCUMENTS

2206444 11/1973 France .
1370619 10/1974 United Kingdom .

OTHER PUBLICATIONS

"Dual-Fuel Control", *Diesel Engineering Handbook*, pp. 288-292.

*Primary Examiner*—E. Rollins Cross
*Attorney, Agent, or Firm*—Brumbaugh, Graves, Donohue & Raymond

[57] ABSTRACT

A system for use of gas, like LPG, as secondary fuel in diesel engines is concerned. Normally aspirated and pressure charged engines with exhaust gas driven charging, with End-speed or All-speed governors or with common-rail-fuel injection systems are all included.

A signal (24,25) proportional to the momentary effective fuel consumption controls the gas supply (20) to the engine (1). A valve (19) in the gas supply (18) is connected to the control lever (16) of the engine governor (12) to allow gas supply only in a load range above approximately 25% and up to a maximum of approximately 40% of the full load total fuel consumption. In the lower load range uncomplete combustion of the gas thus is avoided, in the higher load range both detonation and overload are avoided and the opacity of the exhaust is improved. The consumption of liquid fuel is reduced and the exhaust gas composition is improved. An adjustable stop (28,29) limits the maximum injectable liquid fuel quantity when the engine is operated in the dual-fuel-mode.

The system is designed to be both retrofittable to existing engines and fittable to factory new engines.

14 Claims, 4 Drawing Figures

SYSTEM FOR THE USE OF GAS AS SECONDARY FUEL IN DIESEL ENGINES

The invention relates to a system and apparatus for the use of gas as secondary fuel in a diesel engine, more specially of the high speed automotive type, provided with an injection pump for the diesel fuel fitted with a governor of the end-speed type with control lever for the engine torque, a mixing device for the gaseous secondary fuel with the aspirated combustion air, a pressure regulator for the gas pressure of the gas supplied to the mixing device, and with control means for the metering of the gas quantity supplied.

Since, in practice, also a large number of engines are equipped with a governor of the all speed-type, the invention is equally concerned with a system and apparatus for the use of gas as secondary fuel in a diesel engine, more specially of the high speed automotive type, provided with an injection pump for the diesel fuel with a governor of the all-speed type with a control lever for the desired engine speed, a mixing device for the gaseous secondary fuel with the aspirated combustion air, a pressure regulator for the gas pressure of the gas supplied to the mixing device, and with control means for the metering of the gas quantity supplied.

It is known to feed gas as secondary fuel to diesel engines. On the one hand this is done to economize the consumption of liquid diesel fuel and to consume gas as secondary fuel especially in case said gas is more readily available or even a waste product. On the other hand the system is also applied to improve the composition and the opacity of the exhaust gases in the full load range of the diesel engine. It is known that many diesel engines, and especially older engines of older designs, operate at full load and sometimes even in a certain part of the speed range with maximum injection, near or even over an acceptable smoke limit. Apart from this, the requirements with regard to the smoke limit and the composition of the exhaust gases generally become more severe.

The known systems, however, show a number of disadvantages, like a non-reproduceable control, a critical adjustment, a rather expensive retrofit and sometimes even overloading of the engine.

Since the invention is concerned with diesel engines which use gas as secondary fuel and thus liquid diesel fuel as main fuel, one consequently tries to keep the engine preferably unaltered and more specially to retain the existing compression ratio and the existing air swirl system in the cylinders. In order to operate the engine with different available gaseous secondary fuels sufficiently far from the detonation limit or the self-ignition limit in case of an engine at operation temperature, in general, dependent on the type of gas, no more than up to approximately 30% to 40% of the full load power should be provided by the gas and the remaining power by the standard diesel fuel. The control and/or the dimensioning of the metering means concerned for diesel fuel and for the gas, should be accordingly adjusted or chosen. As far as the gas as secondary fuel is concerned, in the first place LPG will be considered, methane, belonging to the possible gases as well. Theoretically and also by experiment also other fuels are considered, which mix in gaseous or vapour for with the aspirated combustion air before entering the cylinder. Amongst them are alcohols.

It is known that in all diesel engines the diesel fuel injection system and especially the fuel injection pump and the governor are highly qualified and sensitive apparatus. On the one hand they are sealed by the manufacturer in order to exclude overload resulting from both the injected fuel quantity as the maximum speed. On the other hand they are fully dust-proof sealed and only the control lever of the governor extends. With some designs a small number of other extending knobs or levers exist, e.g. for extra fuel supply during a cold start, but these are reduced to a minimum and also designed such that they are dust-proof and do not allow the user to disadjust the pump or governor. The invention aims to provide a more reliable, simpler and better reproduceable control of diesel-gas-mixed operation, whereby as little as possible or preferably no alterations at all of the fuel injection system should be required. Only a small number of components to be fitted externally, preferably consisting of products available in the normal trade, should be used to rearrange the diesel engine for diesel-gas-mixed operation. Not only in last instance a system should be considered which is easy to retrofit in the field to existing engines. This does, of course, not exclude the possibility that also engines from new may be provided with the system according to the invention. A further important aim is to exclude possible overload of the engine. With a minimum of simple and reliable components this should be achieved.

Further, it is desirable that the system should be applicable to engines with and without pressure charging.

A system and apparatus as described in the preamble are according to the invention characterized in that the gas pressure regulator is controlled by a control signal which is substantially proportional to the actually momentary consumed quantity of diesel fuel by the engine and in that a remote adjustable additional upper stop for the control lever of the governor is fitted, which limits its maximum stroke to less than the full load diesel position whenever the engine operates in the diesel-gas mode, and which gives the control lever free up to the full load position in pure diesel operation.

In case the engine is provided with a regulator of the all speed type, the invention is characterized in that the gas pressure regulator is controlled by a control signal that substantially is proportional to the actually momentary consumed quantity of diesel fuel by the engine, and in that a remote adjustable additional upper stop is provided, acting on the control rod of the diesel fuel pump, which additional upper stop limits the maximum stroke to less than the full load diesel position whenever the engine operates in the diesel-gas mode, and which gives the control rod free up to the full load position in pure diesel operation.

In case of an engine fitted with an end speed governor according to the invention no intervention into the inside of the fuel pump or the governor is necessary. Only at the outside an upper stop for the control lever is added. Also in the case of an engine with an all speed governor, no intervention in the governor has to take place, whilst at the fuel pump only an additional upper stop for the control rod has to be added, for which addition all well-known fuel injection pumps are already prepared by the manufacturer. This fitting location is generally the same place where for instance a boost pressure limiter or an extra starting fuel knob is or can be fitted. Thus, no intervention in the proper fuel injection pump is required with either type of governor.

The solution according to the invention is universal, since it makes it possible to control the supplied gas quantity, independent of the load and the speed of the engine. The product of load times speed is known and equal to the effective quantity of diesel fuel consumed at each given moment. Thanks to the independency of the supplied gas quantity from load and speed, automatically the gas supply is reduced in the end control range near the maximum speed of the fuel pump by the governor, proportional with the reduction of the quantity of diesel fuel consumed on said very moment.

The system is applicable for pumps of the Bosch-type built in line as well as of the rotating type. According to a preferred embodiment described below, the system according to the invention is also applicable to fuel injection pump-governor combinations of the rotating type with hydraulic governor like the DPA of manufacturer CAV and the PT system of the US engine manufacturer Cummins.

Because the gas pressure regulator is controlled by a control signal proportional to and derived from the measuring means of the diesel fuel consumption, the gas pressure regulator can deliver gas without requiring a subpressure or vacuum in the outgoing regulated gas pipe, as is the case with the known gas pressure regulator-evaporator combinations, which are used in great quantities for application with spark ignition engines. In doing so it is furthermore possible to avoid the additional installation of a venturi in the air aspiration manifold of the engine. A diesel engine, of course, does not require said venturi by itself and in a number of cases it will also be difficult to find an acceptable location for it. The fitting, however, of a simple gas mixing piece in the existing air aspiration manifold of the engine is sufficient and always easily possible.

From experiments it was found that at a load of the engine of less than approximately 25%, gas, when supplied, would burn incompletely, which would have an adverse influence on both the total fuel consumption as on the composition of the exhaust gases. According to a preferred embodiment of the invention, this embodiment is characterized in that, in the gas line between the gas pressure regulator and the gas mixing device, a gas correction throttle valve is introduced which by means of a rod system is connected in such a way with the control lever that said gas correction throttle valve is completely closed under a predetermined position (of e.g. approximately 25% load) and opens the passage gradually above said position from totally closed up to fully opened.

In case, however, the engine is provided with an all speed governor this preferred embodiment is characterized in that, in the gas line between the gas pressure regulator and the gas mixing device, a gas correction throttle valve is introduced which, through a rod system with an equalizer—which equalizer is connected with its one end with the gas correction valve and with its other end with the control lever of the regulator and being connected with a pivot in between the ends with the extending rod of an actuator (a solenoid or a hydraulic cylinder) of which the position is proportional to the value of the control signal for the gas pressure regulator—is connected in such a way with the control lever, that said gas correction throttle valve remains fully closed under a predetermined position (of e.g. approximately 25% load) and above said position gradually opens the passage between the closed and the fully opened position.

Said gas correction throttle valve is designed in such a way that, slightly dependent of the type and make of the engine, under approximately 25% load, it keeps its passage closed and gradually opens its passage fully above said load when the load of the engine is increased. With small loads of the engines, therefore, little or no gas is consumed.

In the case of an engine with a governor of the all speed type, the position of the control rod in the fuel pump is fully and unknown and is in any case never directly coupled with the position of the control lever of the regulator. The coupling-back of the actually delivered engine power in this case takes place with the same signal which also controls the gas pressure, i.e. the signal derived from the measurement of the momentary diesel-fuel-consumption. The signal is coupled back through the equalizer over the actuator (like for instance a solenoid or a hydraulic cylinder) to the rod system forming the connection between the control lever of the regulator and the control lever of the gas correction throttle valve. With the aid of the equalizer, the power delivered by the engine (diesel fuel consumption) is in a mechanical way divided by the engine speed (position of the control lever of the regulator), making available the engine torque provided by the diesel fuel. Thus, its actioning is nearly equivalent to that with an engine provided with the simpler governor of the end speed type. It is emphasized, that, from such engine load above approximately 25%, when the gas correction throttle valve is fully opened, the metering of the gas quantity is exclusively provided by the gas pressure regular as function of the control signal derived from the measurement of the actually consumed diesel fuel.

Also in case the engine, on which the system according to the invention will be applied, is fitted with pressure charging, the system is applicable without much ado, because the gas is supplied after the air filter and upstream of the pressure charging compressor. In doing so the supplied gas quantity remains a function of the momentary diesel fuel consumption and is thus by no means influenced by the eventual presence of a pressure charging compressor.

According to a preferred embodiment the control signal for the gas pressure regulator is provided by a measuring means of the diesel fuel consumption, which means measures continuously the momentary difference between the flow from the fuel tank to the engine and the return flow of the fuel to the tank. For instance a differential vane pump with two rotors on one shaft and a variable excentricity of one of the rotor housings may be used, in which case the momentary excentricity provides the control signal. Also other and reliable and in the field usable measuring means are available, which can be applied with the invention and which are able to measure comparatively small fuel flows accurately without influencing on their turn the fuel system of the engine in an unacceptable way and which are nevertheless comparatively simple.

When it is requested to prepare an engine for diesel-gas operation, which engine is provided with a diesel injection system in which the fuel boost pressure in the housing of the fuel pump is substantially proportional with the power provided by the engine, like for instance is the case with DPA pumps of the manufacturer CAV or with the PT system of the manufacturer Cummins, then it is advantageous to use for the control signal of the gas pressure regulator said boost pressure directly, which act directly or indirectly through a connecting line on the regulator-diaphragm of the gas pressure regulator, all the above in such a way that with a higher boost pressure of the fuel a higher controlled gas pressure corresponds. When this system is used the measuring device for the diesel fuel consumption becomes superfluous. It will be evident that for the rest the operation of the system remains the same according to the invention.

In case the engine is pressure-charged, the energy contained in the exhaust gases leaving the engine, given by its temperature, its pressure and its mass flow, is substantially proportional as well with the momentary fuel consumption. Its measuring, however, is almost impossible, but in case said energy flow is transformed by for instance an exhaust gas turbine and a compressor driven by it, then the resultant charging pressure is sufficiently proportional with said momentary fuel consumption. The same holds when a pressure-wave-compressor is used, like a Comprex, which uses as well the energy in the exhaust gases. As control signal for the gas pressure regulator, simply the charging pressure may be used either directly or indirectly.

Finally it may be pointed out that, in case LPG is used as secondary gaseous fuel, a normal in the trade available pressure regulator can be used, which generally is already combined with the necessary evaporator. These pressure regulators generally allow passage of vaporized LPG only in case in the outlet line to the gas mixing device a subpressure or vacuum prevails. In case of spark ignition engines this subpressure is provided by a venturi. In case of the present invention said venturi and the subpressure provided by it are not necessary, since the diaphragm of the pressure regulator already receives the external control signal which is a function of the momentary diesel fuel consumption. Therefore a normally in the trade available vaporizer-pressure regulator can be used, which only needs to be supplemented with the actuator which reacts on said control signal. For this purpose a solenoid or a hydraulic cylinder can be used, depending whether the control signal is an electric or hydraulic one.

With the aid of the following description of the figures preferred embodiments according to the invention will be explained more in detail.

In the three figures corresponding parts are indicated with the same references, whilst parts with the same function but differently executed are indicated with the same reference followed by the numeral 1.

Figure 1:
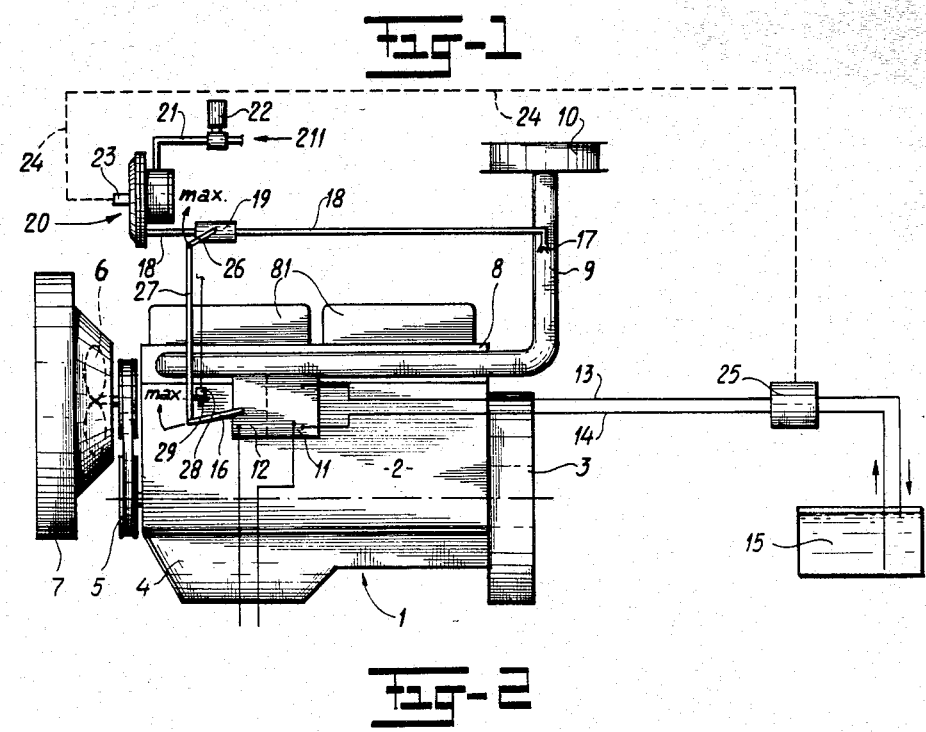
FIG. 1 illustrates schematically an engine with the system for diesel-gas operation according to the invention, fitted to a diesel engine provided with a governor of the end speed type.

With reference 1 a diesel engine of the automotive type is indicated. The crankcase and cylinder block form as usual one integral part 2. At the rear side a flywheel with bell housing 3 are fitted, the lower side of the crank case being closed by a oil sump 4. At the front side of the engine, driven by a not illustrated crank shaft, there is an auxiliary drive system 5, which between others drives a fan 6 for the cooling of the engine cooling fluid in a radiator 7. With the same drive 5 other, not further illustrated, auxiliaries can be driven. On the cylinder block 2 one or more cylinder heads 8 are fitted, closed at their upper side by valve covers 81. Along the visible side in FIG. 1 of the engine runs along the cylinder heads 8 the air inlet manifold 9, through which the engine aspirates its combustion air through an air filter 10. The engine is provided with a schematically indicated diesel fuel injection pump 11, which as usual is provided with an integral regulator 12. Not indicated is the drive of the fuel pump and the regulator, but it will be clear for an expert that this is done in the usual way proportional to the speed of the crank shaft. The usual injectors and fuel injection lines are not indicated as well. Through a fuel supply line 3 diesel fuel is fed to the injection pump from a tank 15, the surplus fuel together with eventual leak fuel from the injectors being returned to the tank 15 as usual through the return line 14. On the regulator 12 the normal control lever 16 is fitted. The regulator 12 in FIG. 1 is of the end speed type, so that with the control lever 16 the control rod of the fuel injection pump is directly adjusted and thus the torque supplied by the engine. With the above description the normal parts belonging to a diesel engine are described as far as they are of interest for the present invention.

To adapt the engine for diesel-gas-mixed operation first a gas mixing device 17 has to be installed in the air intake manifold 9. Through a line 18, in which a gas correction throttle valve 19 is incorporated, gas is fed to the engine from a gas pressure regulator 20. Said regulator contains as usual a non-illustrated control diaphragm and can, in case LPG is used as secondary fuel, furthermore be provided with a not further detailed evaporator. The gas, for instance LPG, is supplied through a line 21 to the pressure regulator 20, in which line a remote operable valve 22 is installed, which line 21 supplies the secondary fuel in fluid or gaseous form from a not illustrated source 211. The gas pressure prevailing in line 18 connected to the outlet of the pressure regulator 20 and the resulting gas flow are controlled by an actuator 23, which receives a control signal through a connection 24. Said control signal 24 may be electric or hydraulic, in which case the actuator 23 may consist of a solenoid respectively a hydraulic-piston cylinder combination. Both provide a force on the diaphragm of the gas pressure regulator 20, proportional with the value of the control signal 24. Said control signal 24 is produced by a means 25 which measures the actual consumed quantity of diesel fuel as difference between the fuel flow through line 13 from the tank 15 and return flow through the line 14. The signal produced by the measuring means 25 for the consumption of diesel fuel can for instance be electric or hydraulic.

The gas correction throttle valve 19 is provided with a control lever 26 which by means of a rod system 27 is mechanically coupled with the control lever 16 of the governor 12. The operation of the gas correction throttle valve is such that up to a predetermined position of for instance approximately 25% load, the valve 19 remains fully closed, but above said position the passage gradually opens between the fully closed and fully opened position. Therefore the quantity of gas supplied to the engine above said predetermined value of for instance approximately 25% power, soon is controlled exclusively by the signal 24 which is proportional with the momentary actual diesel fuel consumption by the engine. In service therefore whenever the end governor 12 retracts the diesel fuel control rod in case the engine speed surpasses the maximum, the gas quantity supplied is also reduced since the diesel fuel consumption is reduced.

In order to avoid an overload of the engine by the supply of gas apart from an uncontrolled supply of diesel fuel, an externally fitted upper stop 28, 29 for the control lever 16 of the governor 12 is provided. Said upper stop is remotely actuatable and may consist of a solenoid 28 with a stop 29. When actuating the solenoid the stop 29 forms an extra stop for the control lever 16, limiting its stroke to e.g. a maximum of 75% of the full load diesel power. By energizing simultaneously the gas supply valve 22 a proportional quantity of gas will be supplied to the engine, the calibration of the gas supply system being such that the remaining for instance 25% of the power will be supplied by the gas, so that the engine again is able to deliver its rated power for the full 100%. If subsequently the extra upper stop 28 is deactivated, the stop 29 retracting and the control lever 16 becoming adjustable again to the full 100%, the diesel engine may also be loaded for the full 100% in the diesel mode, and by simultaneously de-energizing the valve 22 the gas supply will be fully interrupted. It will be evident that the values mentioned above of 75% and 25% are only examples, but in connection with the relatively high compression ratio of a diesel engine compared to a spark ignition engine, in general and in practice gas can only be supplied up to a maximum of about 40% in order to avoid detonation. The remaining power will remain to be supplied by the liquid diesel fuel.

For the means 25 capable to measure the diesel fuel consumption, in trade available measuring means are applicable, like e.g. a differential vane pump with two rotors on one single shaft and a variable excentricity of one of the rotor housings, whereby the eccentricity on each moment provides the control signal 24 by converting it into for instance a hydraulic or electric signal.

Figure 2:
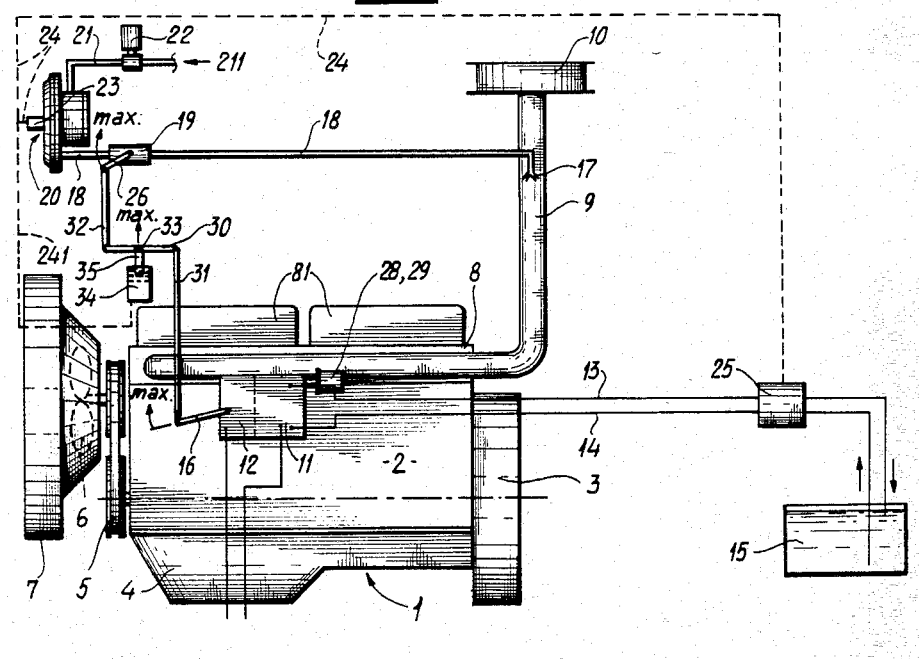
FIG. 2 illustrates the same engine and the same system as FIG. 1, but applied to an engine provided with an all speed governor.

In FIG. 2 the same engine is depicted as in FIG. 1 fitted with the same gas installation, but fitted with a different governor 12 to the diesel injection pump 11, being in this case of the all speed type. Independent of the position of the control lever 16 the control rod in the fuel pump may take any position between full load and zero load, because with such a governor only a certain speed of the engine is adjusted with the control lever 16 and the governor answers said adjustment by controlling the control rod in order to supply the unknown torque requirements in order to have the engine drive the load at the adjusted speed.

A limitation of the maximum diesel fuel to be injected can therefore not take place through the control lever 16, but it should take place on the control rod of the fuel pump itself. Therefore, the extra upper stop 28, 29 is executed in this case as adjustable limiting stop for the fuel pump-control rod, which is generally known and available in the trade. Its operation and its purpose are the same as those of the additional upper stop 28-29, according to FIG. 1.

The rod system, however, between the gas correction throttle valve 19 and the control lever 16 of the governor 12, is arranged such that the actual momentary diesel fuel consumption is introduced as variable value as well. For this purpose a branch 241 is made to the control signal connection 24, which acts on an actuator 34 with an extending actuator rod 35 at the end of which a equalizer 30 is pivotably fitted in a point 33. The one end of the equalizer is connected through a rod 32 with a control lever 26 of the gas correction throttle valve 19, whilst the other end of the equalizer 30 is connected through a rod 31 with the control lever 16 of the engine governor 12.

In FIG. 2 the actuator 34 is schematically depicted in a design corresponding to the case in which the control signal in the connection 241 is a hydraulic one, in which case a piston is able to move the pivot 33 of the equalizer higher or lower against the force of a spring. In doing so a coupling back of the engine power provided is possible through the actually consumed diesel fuel quantity, so that on the one hand overload of the engine and on the other hand overspeed both are impossible. The characteristic of the engine also in the diesel-gas mode, is substantially the same as the characteristic of the engine according to FIG. 1 thanks to the above described lay-out.

Figure 3:
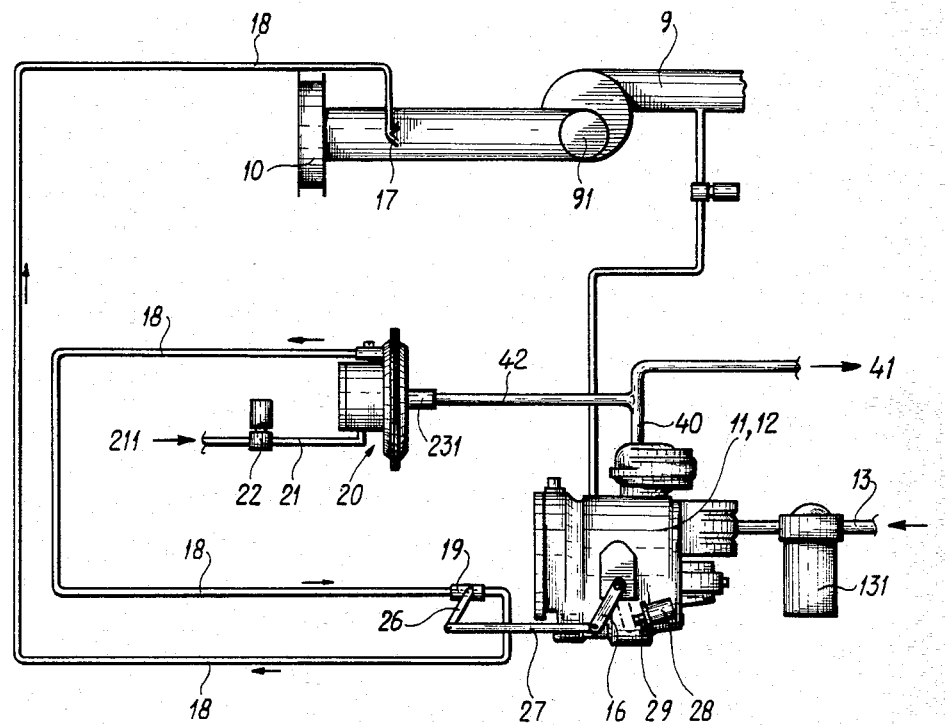
FIG. 3 illustrates schematically the system according to the invention, applied to an engine with a fuel pump-governor system in which the fuel boost pressure is substantially proportional to the power supplied by the engine, more specially the Cummins PT system.

In FIG. 3 the engine itself is not illustrated for clarity reasons. An engine with pressure-charging compressor 91 is concerned, which is fitted after the gas mixing device 17 in the inlet manifold 9. Below only the differences with the executions according to FIGS. 1 and 2 will be described. In FIG. 3 the system is depicted as applicable to a Cummins engine with PT-diesel injection system. The fuel injection pump with governor 11–12 again forms a unit, but there are with this system no separate high speed injection pipes for each individual cylinder. On the contrary, there extends a common pipe 40, 41 passing and connected to all injectors of the engine. In said pipe 40,41 prevails a boost pressure of several bar, which is substantially proportional to the momentary diesel fuel consumption of the engine. Therefore said boost pressure can be led through a branch pipe 42 directly to the actuator 231 of the gas pressure regulator 22. The boost pressure in the pipes 40, 41 and 42, controlled by the fuel pump with the integral governor 11, 12 provides the same function as the control signal in the connection 24 according to the FIGS. 1 and 2.

The control lever 16 of the governor receives again an additional upper stop 28, 29 which acts in the same way as the upper stop according to FIG. 1. Instead of the upper stop 28, 29 also an—not illustrated—in- and off-switchable throttling means, but not intended for control purposes, may be applied in the fuel pipe 40 leaving the fuel pump governor and situated upstream of the branch pipe 42, which limits equally well the maximum diesel torque.

Also, when an injection system of the CAV/DPA type is used, the fuel boost pressure in the fuel injection pump is substantially proportional to the momentary diesel fuel consumption of the engine and thus can be applied as control signal 42 for the gas pressure regulator 20 as well.

Figure 4:
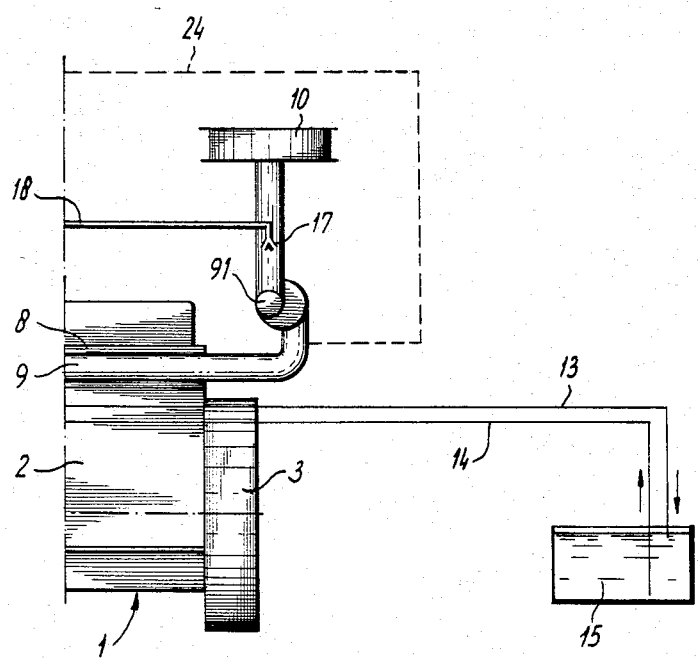
FIG. 4 illustrates the right part of FIGS. 1 or 2, in which the engine is provided with a schematically indicated pressure charging compressor, driven by the exhaust gases flowing through a turbine or a pressure wave compressor (Comprex).

FIG. 4 illustrates schematically an engine according to FIG. 1 or FIG. 2, provided with pressure charging by means of a compressor 91 driven by exhaust gas energy. It is incorporated in the air aspiration pipe or in the air-fuel-mixture suction pipe after the air filter 10 and possible other equipment and downstream of an eventual cooler.

Said compressor 91 may consist of an exhaust gas driven turbine or form part of an exhaust gas-pressure wave transmitter, like a Comprex. The boost pressure produced generally is sufficiently proportional with the momentary consumed-diesel-fuel quantity, so that for the control signal 24 of the gas pressure regulator the charging pressure can be used directly (as illustrated) or indirectly.

I claim:

1. A system for the use of gas as a secondary fuel in a diesel engine of the high speed automotive type, having a substantially integral injection pump and speed governor unit for supplying diesel fuel, said system comprising:
   means for supplying gas in an amount to act as a secondary fuel;
   means including a mixing device for introducing said gas into aspirated combustion air;
   means for obtaining a control signal at least substantially proportional to the momentary rate of diesel fuel consumption by the engine;
   a pressure regulator means for regulating the gas pressure of the gas supplied from the gas supplying means to said mixing device, wherein said pressure regulator means is responsive to said control signal thereby to regulate the quantity of gas supplied to said engine as a function of the momentary rate of diesel fuel consumption; and
   remotely adjustable stop means acting on said governor-pump unit for limiting the maximum injectable diesel fuel quantity to less than the full load pure diesel quantity responsive to the operation of the engine in the diesel/gas mode, and for permitting full load diesel fuel quantity to be supplied responsive to pure diesel operation.

2. A system as defined in claim 1, wherein said governor is of the end speed type with a control lever for adjustment of the engine torque, and wherein said remotely adjustable stop means comprises a controllable upper stop for said control lever, which limits its maximum stroke to less than full load diesel position whenever the engine operates in the diesel/gas mode, and which permits the control lever to move to the full load position in pure diesel operation.

3. A system as defined in claim 1, wherein said governor is of the all speed type with a control lever for the desired engine speed, and wherein said diesel fuel injection pump has a control rod for controlling diesel fuel delivery, and wherein said stop means includes an upper stop acting on said control rod for limiting the maximum stroke to less than the full load diesel position whenever the engine operates in the diesel/gas mode, and which permits the rod to move to the full load position in pure diesel operation.

4. A system as defined in claim 1, 2, or 3, comprising means for interrupting the flow of gas from the gas supplying means, for operating said engine in pure diesel operation, wherein said stop means is responsive to the actuation of the interrupting means.

5. A system as defined in claim 2, wherein the means for introducing said gas includes a gas line between said pressure regulator means and said mixing device, and comprising a gas correction throttle valve disposed in said gas line and means for connecting said throttle valve with said control lever for actuating said valve responsive to movement of said control lever, wherein said gas correction throttle valve is fully closed below a pre-determined position of said lever and above said position gradually opens the passage between fully closed and fully open, whereby below a pre-determined load the supply of secondary gas is interrupted and said engine operates solely on diesel fuel.

6. A system as defined in claim 3, wherein the means for introducing said gas includes a gas line arranged between said gas pressure regulator means and said mixing device, and comprising a gas correction throttle valve, and a rod system and an actuator for actuating said throttle valve; which rod system includes an equalizer having one end connected to the gas correction valve, its other end connected to said control lever of the governor, and an intermediate pivot connected to said actuator; and means for controlling said actuator proportional to the value of said control signal for the pressure regulator means, wherein said valve is connected with said control lever and said actuator such that the gas correction throttle valve is fully closed below a pre-determined engine load and above said load gradually opens the passage between fully closed and fully open, whereby below said predetermined load level the flow of secondary gas is interrupted and said engine operates solely on diesel fuel.

7. A system as defined in claim 1, 2 or 3, wherein the means for obtaining a control signal comprises a device for measuring diesel fuel consumption which continuously measures the momentary difference between the flow from the diesel fuel tank to the engine and the return flow of the fuel to the tank.

8. A system as defined in claim 7, wherein said device comprises a differential vane pump with two rotors fitted to one shaft and a variable eccentricity of one of the rotor housings, which momentary eccentricity forms said control signal.

9. In a diesel engine of the high speed automotive type, having a substantially integral injection pump and speed governor unit for supplying diesel fuel, a system for the use of gas as a secondary fuel in said engine comprising:
   means for supplying gas in an amount to act as a secondary fuel;
   means including a mixing device for introducing said gas into aspirated combustion air;
   means for obtaining a control signal at least substantially proportional to the momentary rate of diesel fuel consumption by the engine;
   a pressure regulator means for regulating the gas pressure of the gas supplied from the gas supplying means to said mixing device, wherein said pressure regulator means is responsive to said control signal thereby to regulate the quantity of gas supplied to said engine as a function of the momentary rate of diesel fuel consumption; and
   remotely adjustable stop means acting on said governor-pump unit for limiting the maximum injectable diesel fuel quantity to less than the full load pure diesel quantity responsive to the operation of the engine in the diesel/gas mode, and for permitting full load diesel fuel quantity to be supplied responsive to pure diesel operation.

10. A diesel engine as defined in claim 9, wherein said governor is of the end speed type with a control lever for adjustment of the engine torque, and wherein said remotely adjustable stop means comprises a controllable upper stop for said control lever, which limits its maximum stroke to less than full load diesel position whenever the engine operates in the diesel/gas mode, and which permits the control lever to move to the full load position in pure diesel operation.

11. A diesel engine as defined in claim 9, wherein said governor is of the all speed type with a control lever for the desired engine speed, and wherein said diesel fuel injection pump has a control rod for controlling diesel fuel delivery, and wherein said stop means includes an upper stop acting on said control rod for limiting the maximum stroke to less than the full load diesel position whenever the engine operates in the diesel/gas mode and which permits the rod to move to the full load position in pure diesel operation.

12. A diesel engine as defined in claim 9, wherein said engine includes an air filter for the aspiration of combustion air, and a pressure charging compressor for pressure charged operation, and wherein said mixing device is placed downstream of said air filter and upstream of said pressure charging compressor.

13. A diesel engine as defined in claim 9, wherein said engine is equipped with a diesel injection system in which the fuel boost pressure in the fuel pump is substantially proportional to the power provided by the engine, for example the DPA type of the British CAV or the PT system of the U.S. manufacturer Cummons, wherein the means for obtaining a control signal comprises said boost pressure connected to a control diaphragm of said regulator means, wherein with a higher boost pressure an accordingly higher regulated gas pressure is provided to said mixing device.

14. A diesel engine as defined in claim 9, wherein said engine has an exhaust gas pressure charging system, for example a turbo compressor or pressure wave compressor (COMPREX), wherein the means for obtaining a control signal is connected for receiving said charging pressure downstream of the compressor.

* * * * *